(12) United States Patent
Stuemke

(10) Patent No.: US 7,240,910 B2
(45) Date of Patent: Jul. 10, 2007

(54) RECEPTACLE CADDY

(75) Inventor: Chad Stuemke, St. Louis, MO (US)

(73) Assignee: Continental Commercial Products, LLC, Bridgeton, MO (US)

( * ) Notice: Subject to any disclaimer, the term of this patent is extended or adjusted under 35 U.S.C. 154(b) by 20 days.

(21) Appl. No.: 11/038,874

(22) Filed: Jan. 20, 2005

(65) Prior Publication Data

US 2006/0157946 A1    Jul. 20, 2006

(51) Int. Cl.
*B62B 1/00* (2006.01)
(52) U.S. Cl. ............... 280/79.5; 280/47.26; 280/47.29
(58) Field of Classification Search ............ 280/47.26, 280/47.27, 47.17, 47.35, 641, 652, 79.5, 280/79.6, 47.29; 211/70.6, 65, 71.01; 220/23.83, 220/23.4; 182/129, 46; D34/10; 108/47
See application file for complete search history.

(56) References Cited

U.S. PATENT DOCUMENTS

| | | | | |
|---|---|---|---|---|
| 1,593,834 A | * | 7/1926 | McNeal et al. ............... 108/47 |
| 3,894,748 A | * | 7/1975 | Ratcliff ........................ 280/641 |
| 4,475,660 A | | 10/1984 | Cain | |
| D304,631 S | | 11/1989 | McCarville | |
| 4,947,998 A | * | 8/1990 | Smeller ...................... 211/70.6 |
| 5,111,951 A | * | 5/1992 | Breen et al. ................ 220/23.4 |
| D330,103 S | | 10/1992 | Andrews, Jr. et al. | |
| 5,211,294 A | * | 5/1993 | Garman ...................... 211/70.6 |
| 5,380,033 A | | 1/1995 | Harling | |
| 5,573,081 A | * | 11/1996 | Bartnicki et al. ........... 182/129 |
| 5,713,499 A | | 2/1998 | Daniel | |
| 5,881,891 A | * | 3/1999 | Murphy, Jr. ................ 211/70.6 |
| 6,179,306 B1 | * | 1/2001 | Maxwell .................... 280/47.26 |
| 6,311,841 B1 | * | 11/2001 | Hodges ...................... 220/23.83 |
| 6,823,998 B2 | * | 11/2004 | Fabregas .................... 211/70.6 |
| D508,596 S | * | 8/2005 | Chochinov et al. .......... D34/10 |
| 2003/0213090 A1 | | 11/2003 | Holsten et al. | |

* cited by examiner

*Primary Examiner*—Hau Phan
(74) *Attorney, Agent, or Firm*—Thompson Coburn LLP

(57) ABSTRACT

A caddy tray that is removably attachable to a handle of a trash receptacle for storing and transporting janitorial supplies and tools on the receptacle.

12 Claims, 3 Drawing Sheets

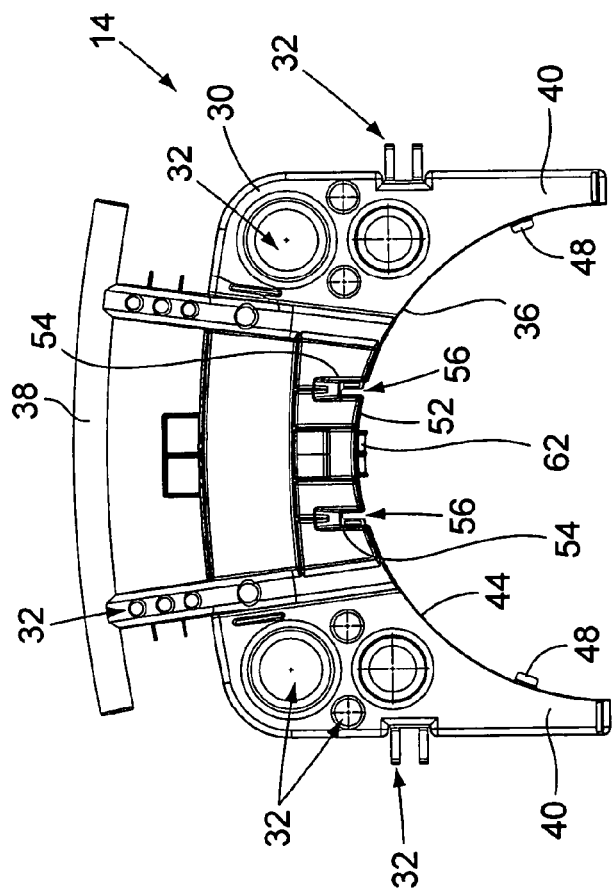
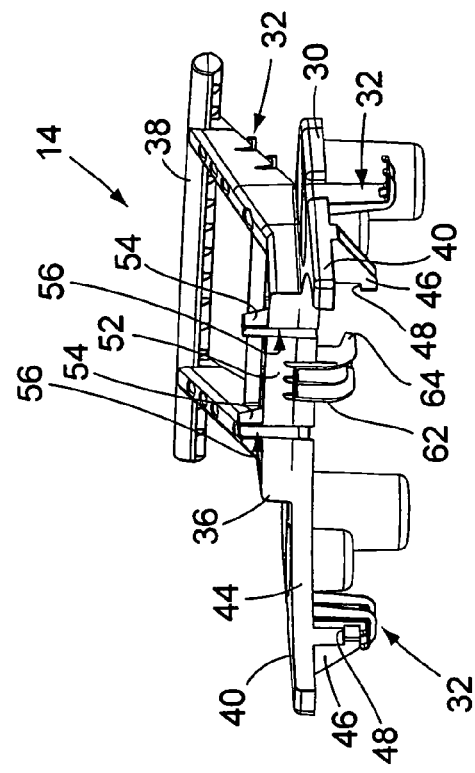
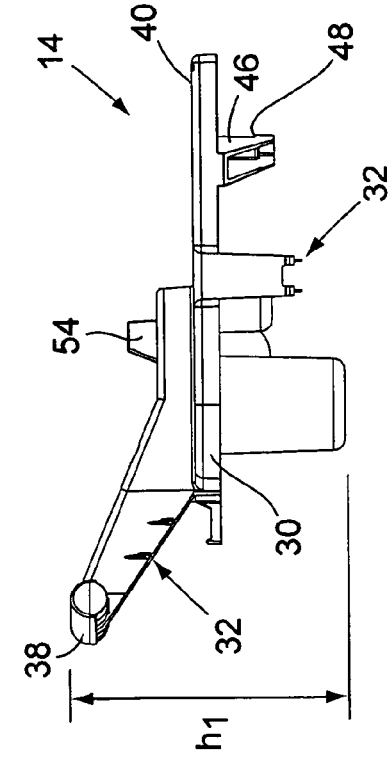

RECEPTACLE CADDY

FIELD OF THE INVENTION

This invention relates generally to apparatus for storing and transporting janitorial supplies and tools and, more particularly, to a caddy tray that is removably attachable to a handle of a trash receptacle for storing and transporting janitorial supplies and tools on the receptacle.

BACKGROUND OF THE INVENTION

Janitorial carts allow a janitor to store and transport supplies and tools on the cart. A typical janitor cart is large enough to support janitorial tools such as a tool box, bucket, mops, brooms, dust pans, etc. In this manner, while at a janitorial closet, the user (e.g. a janitor) can assemble all of the supplies and tools needed and then proceed through a facility performing janitorial services as the user proceeds. Unless the janitor runs out of supplies, realizes a need for an additional supply or tool, or runs out of storage space on the cart, the janitor need not return to the closet until the maintenance activities are complete. These janitorial carts, however, tend to be large, bulky, and unwieldy (particularly in confined areas).

Furthermore, because a significant portion of a janitor's duties includes picking up refuse, debris, and other loose objects, the janitor must also usually bring along a refuse receptacle in addition to the cart. Thus, it is necessary that the janitor handle the cart and receptacle at the same time or the janitor must make two trips to the closet to retrieve first the cart and then the receptacle (or vice versa).

Therefore a need exists for improved janitorial apparatus and methods.

SUMMARY OF THE INVENTION

It is in view of the above problems that the present invention was developed. The invention provides improved janitorial apparatus and methods.

In a first embodiment, the present invention provides a receptacle caddy that includes a tray-like body that engages the handle and a portion of a lower rim of a large refuse can (i.e. a receptacle) in removably attaching the tray to the can. The tray includes pockets, wells, tool openings, partitioned areas, hooks, and hangers that allow the user to store various janitorial tools and supplies on the tray. A brace is formed with two curved arms that project outwardly from below the tray and resiliently clamp around the sidewall of the receptacle to support the tray in a horizontal orientation on the receptacle. Preferably, the brace is adapted to engage, from below, a lower rim extending around the upper sidewall of the receptacle. The tray and the brace may be a single unitary piece with the brace arms being dimensioned to extend up to one half of the way around the receptacle.

In a second embodiment, the present invention provides a receptacle caddy that includes a tray-like body that engages a handle of the receptacle (by, for example, hanging from the handle or connecting to the handle) and a brace that extends around the receptacle and maintains the body in a substantially horizontal orientation. At least a portion of the tray stores a janitorial device such as a janitorial tool or a container for a janitorial supply. The brace engages a sidewall of the receptacle in order to provide support to the body. In the alternative, the brace may engage a lower rim of the sidewall from below and may extend about half of the way around the receptacle. Preferably, the portion of the body that stores the janitorial devices (e.g. supplies or tools) is a pocket, an opening, a well, a partitioned area, a hook, or a hanger. In a preferred embodiment, the tray and the brace form a single unitary piece that includes a handle (of the caddy) for moving the receptacle.

In yet another embodiment, the caddy includes a second caddy body that engages the other handle of the receptacle. A brace may also be provided for the second caddy body.

In a third embodiment, the present invention provides a janitorial cart that is assembled by adding a receptacle caddy to a receptacle. Preferably, the receptacle of the cart includes wheels that allow the cart to be moved about with relative ease. A second caddy may also be added to the receptacle to expand the janitorial device storage capability of the cart. Also, the caddy(s) leave an upper opening and rim of the receptacle unobstructed to accept a receptacle liner. Further, the caddy is comprised of a body and a brace that engages the sidewall of the receptacle in removably attaching the caddy to the receptacle. The brace can be located on the caddy so that the weight of the caddy causes the brace to engage beneath a rim of the receptacle. The body of the caddy can be positioned below the rim.

Additionally, the present invention provides a method of using a receptacle. The method includes engaging a handle of the receptacle with a tray-like caddy body and engaging a sidewall of the receptacle with a brace for the caddy body. Also, the method also includes leaving an upper opening and rim of the receptacle unobstructed to accept a liner for the receptacle. Preferably, the method also includes lining the receptacle with the liner while the caddy body is engaged with the handle of the receptacle. A janitorial supply or tool may also be stored on the caddy or on a second caddy on the receptacle. Further, the method can include pressing down on the caddy so that the receptacle, with the caddy attached, tilts toward the caddy side of the receptacle.

In yet another embodiment, the present invention provides a two-sided receptacle caddy that includes two tray-like caddy bodies and a brace for at least one of the bodies. Of course, a brace can be provided for both caddy bodies. Preferably, the caddies and the brace(s) form a single unitary piece.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate exemplary embodiments of the present invention and together with the description, serve to explain the principles of the invention. In the drawings:

FIG. 2 illustrates a top plan view of the receptacle caddy of FIG. 1 removed from the receptacle;

FIG. 3 illustrates a side elevation view of the receptacle caddy of FIG. 2;

FIG. 4 illustrates a perspective view of the front of the caddy;

DETAILED DESCRIPTION OF THE PREFERRED EMBODIMENTS

Referring to the accompanying drawings in which like reference numbers indicate like elements, FIGS. 1 to 4 illustrate a janitorial cart constructed in accordance with the principles of the present invention.

The janitorial cart 10, of the current embodiment, generally includes a receptacle 12 and at least one caddy 14 hanging from, attached to, or otherwise engaged with the receptacle 12.

Figure 1:
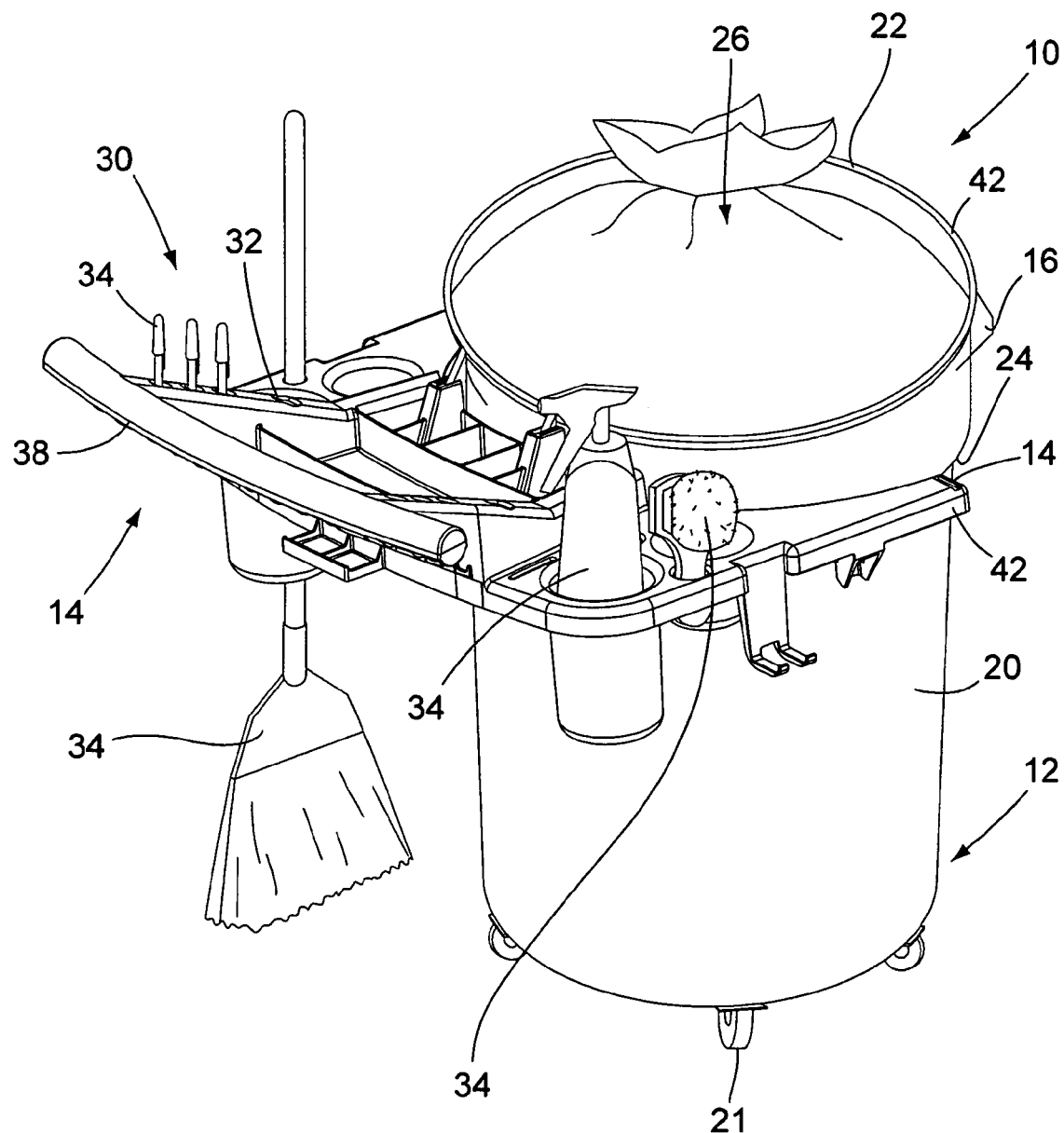
FIG. 1 illustrates a perspective view of a janitorial cart comprised of a receptacle and a receptacle caddy in accordance with the principles of the present invention.

The receptacle 12 typically includes a pair of handles 16, a shoulder 18, a sidewall 20, and a set of wheels 21. As shown in FIG. 1, the shoulder 18 has an upper surface (or upper rim) 22 and a lower surface (or lower rim) 24. The upper rim 22 surrounds a top opening or aperture 26 of the receptacle into which the user of the cart 10 can place refuse, debris, and other articles. The set of wheels 21 allows the receptacle to be moved about with ease by the janitor or other users. The set of wheels 21 can be affixed to the receptacle 12 or they can be provided on a dolly-like mechanism that removable attaches to the receptacle 12. In any case, whether the receptacle 12 has affixed wheels 21, attached wheels, or no wheels does not alter the scope of the invention.

The caddy 14 includes a body 30 with preferably at least one structure (or portion) 32 for storing janitorial devices 34, a brace 36, and a handle 38. The body 30 is preferably shaped like a tray and may include many different pockets, openings, wells, partitioned areas, hooks, and hangers 32 that allow the user to store various janitorial tools and supplies 34 (i.e. janitorial devices) on the cart 10. Being preferably located under the caddy body 30, the brace 36 engages the sidewall 20 of the receptacle 12 and supports the tray-like body 30 in a generally horizontal orientation. Preferable, the brace 36 includes a pair of arms 40 that resiliently clamp, and extend around, the sidewall 20 of the receptacle 12. However, the brace need not be under the caddy body 30 or even have arms 40. Rather, the brace 36 can be at about the same height as the caddy body 30, or even above, the caddy body 30. In the alternative, the brace 36 can engage a portion of the receptacle handle 16 to maintain, stay, or support the caddy 14 in a generally horizontal orientation.

With the caddy 14 hanging from the handle 16, the weight of the caddy 14 causes the brace 36 to press against the receptacle sidewall 20 as illustrated in FIG. 1. In one preferred embodiment, the brace 36 engages the sidewall 20 at a location that is spaced apart from, and below, the shoulder 18. In another preferred embodiment, the brace 36 engages the sidewall 20 at approximately the location where the shoulder 18 protrudes from the sidewall 20. Because the weight of the caddy 14 causes the caddy to attempt to pivot about the receptacle handle 16, the brace 36 and the arms 40 will engage the lower rim 24 of the shoulder 18, thereby steadying the caddy 14 on the receptacle 12. Additionally, any downward force exerted on the caddy handle 38 (or other portion of the caddy 14) by the user will cause the caddy to pivot about the receptacle handle 16 and cause the brace arms 40 to engage beneath the receptacle lower rim 24, resisting the pivoting movement of the caddy. Of course any upward force (of a likely magnitude) exerted on the caddy handle 38 will be resisted by the weight of the caddy 14 and any janitorial supplies or tools 34 stored on the caddy 14. In the alternative, or in addition, the caddy 14 can removably attach to the receptacle handle 16 so that additional stability is provide to the caddy 14 while it is on the receptacle 12. Thus, the current embodiment provides a caddy 14 that rests securely on the receptacle 12.

To assemble the janitorial cart 10, the user obtains a receptacle 12 and a caddy 14. Then, the user positions the caddy 12 over the receptacle handle 16 while slipping the arms 40 around the receptacle 12. To complete the assembly, the user merely allows the caddy 14 to settle on the receptacle handle 16 or, if the caddy 14 or handle 16 include latches, detents, or their equivalents, the user can positively engage the caddy 14 with the handle 16.

Thus, the current embodiment allows the user to push the cart 10 on the wheels 21 between work locations using the caddy handle 38. At each work location, the user can change the janitorial supplies and tools 34 stored on the caddy 14. The user can also stop and use those supplies and tools 34 to perform maintenance tasks or simply place refuse and debris in the receptacle 12.

As is well known in the art, the receptacle 12 can also be lined with a separate trash bag to prevent the interior sidewalls of the receptacle from becoming fouled by the refuse in the receptacle. If so, eventually, the receptacle 12 will become full of refuse or it will become otherwise desirable to empty the receptacle 12 by removing and replacing the liner. Because the caddy 14 engages the receptacle 12 at only the handle 16, the sidewall 20, and perhaps the lower rim 24 of the shoulder 18, the upper rim 22 is free and can be accessed around its entire periphery for the removal of the liner and for replacing it with a new liner. Of course, the caddy 14 could engage the upper rim 24 without departing from the scope of the present invention.

Additionally, with the upper rim 22 (and adjacent surfaces) of the shoulder 18 free of obstructions, other receptacles 12 can be stacked one inside each other to save space or avoid repeated trips back and forth between storage locations when more than one receptacle 12 is desired for a particular maintenance task. Moreover, because the caddy 14 can be designed to have a height "h1" about equal to the height "h2" of the receptacle handle 16, it is possible to stack the receptacles 12 whether or not each of the receptacles 12 has an attached caddy 14. The resulting ability to stack the carts 10 compactly is simply not provided, or even suggested, by previous janitorial carts.

In addition to providing unfettered access to the upper rim 22 (and adjacent side portions of the shoulder 18), the present invention also provides a cart 10 with increased resistance to tipping over compared to previous janitorial carts. As shown in FIG. 3, the caddy body 30 is positioned below the uppermost portion (the upper rim 22) of the receptacle 12. In fact, since the caddy 14 hangs from the receptacle handle 16, the position of the center of gravity of the caddy 14 can be chosen to be essentially as low as the receptacle designer desires relative to the receptacle 12. Thus, by lowering the center of gravity of the overall cart 10, the caddy 14 aids in preventing tip-overs of the cart 10. Nonetheless, because the arms 40 can be positioned to engage the lower rim 24 of the shoulder 18, the user can push down on the caddy handle 38 causing the cart 10 to tip toward the caddy side of the receptacle 12. In this manner the cart 10 can be maneuvered over door sills, steps, and other obstructions on the floor, or surface, over which the cart 10 may be pushed.

Another embodiment provides a cart 10 with mating connectors or couplers 42 at the distal ends of the brace arms 40. The couplers 42 allow the caddy 10 to couple to another caddy 10 on another handle 16 of the receptacle. When coupled, the pair of caddies 10 help stabilize each other because each of the receptacle handles 16 and the sidewalls 20 (where it engages each brace 36) is available to counteract any external force acting on the either caddy 10. And, of course, adding an additional caddy 14 to the cart 10 increases the storage capacity for janitorial supplies and tools of the overall cart 10. In contrast, when less storage space on the cart 10 is desired, one of the caddies can be easily removed to provide a smaller, lighter, more maneuverable cart 10.

Figure 5:
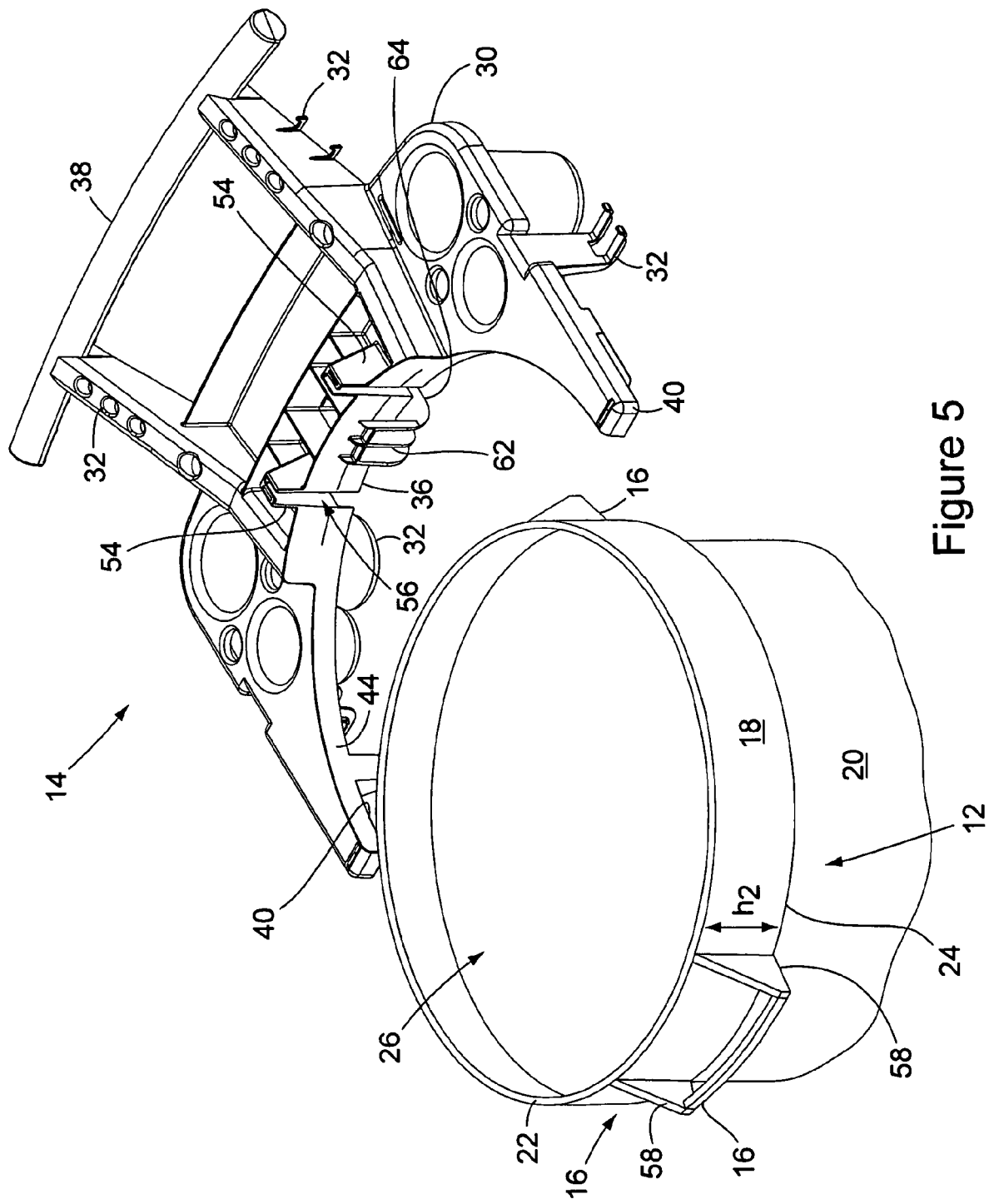
FIG. 5 illustrates a perspective view of the receptacle caddy and a partial view of the receptacle handle of the janitorial cart of FIG. 1.

Referring to FIG. 5, it can be seen that the pair of brace arms 40 project as an integral extension outwardly from the portion of the caddy body 30 formed as the tray. In the current embodiment, the brace arms 40 and the tray of the caddy body 30 are formed of a resilient plastic that enables the brace arms 40 to be resiliently flexed away from each other. The resiliency of the plastic biases the brace arms 40 back to their original positions shown in FIG. 5. A substantially continuously curved surface 44 extends from the interior of one of the brace arms 40 across the forward edge of the tray portion of the caddy body 30 to the interior of the opposite brace arm 40. The curved surface 44 is shaped and dimensioned to fit flush against a curved portion of the receptacle sidewall 20 in attaching the caddy 14 to the receptacle 12. Each brace arm 40 includes a downwardly depending post 46 (see FIG. 3). Each post 46 has an inwardly projecting ledge 48 toward the bottom of the post.

A central portion 52 of the curved surface 44 has an increased vertical height. A pair of gusset columns 54 connect the curved surface central portion 52 to the caddy body tray 30. Together, the curved surface central portion 52 and the gusset columns 54 reinforce this area of the caddy 14. A pair of slots 56 is formed through the curved surface central portion 52 and extend into the pair of gusset columns 54. As seen in FIG. 5, each of the slots 56 has a vertical portion extending through the curved surface central portion 52 and a horizontal portion extending through the tops of the gusset columns 54. The gusset column slots 56 are dimensioned to enable side panels 58 of the receptacle handle 16 to pass through the slots 56 into the interior volumes of the pair of gusset columns 54 in attaching the caddy 14 to the receptacle 12.

A clamp having a clamp base 62 and a clamp flange 64 extends downwardly from the central portion 52 of the caddy curved surface. As seen in FIG. 5, the clamp base 62 is formed integrally with the curved surface central portion 52 (see FIG. 2) and projects downwardly from the surface central portion to a position below the caddy body 30. The downward extension of the clamp base 62 spaces the clamp flange 64 (see FIG. 4) below the bottom surface of the caddy body 30. From the bottom of the clamp base 62 the clamp flange 64 projects generally horizontally beneath the caddy body 30. The clamp flange 64 is spaced a sufficient distance below the bottom of the caddy body 30 to receive the receptacle handle 16 in the space between the clamp flange 64 and the caddy body 30.

In attaching the caddy 14 to the receptacle 12, the caddy 14 is first positioned adjacent the receptacle handle 16 with the caddy brace arms 40 projecting in a generally upward direction and the clamp flange 64 projecting in a generally downwardly direction. The clamp flange 64 is then moved over the top of the receptacle handle 16 and is then inserted downwardly between the receptacle handle 16 and the receptacle sidewall 20. The downward movement is continued until the clamp base 62 engages against the top of the receptacle handle 16. The caddy 14 is then moved in a pivoting movement on the receptacle handle 16 causing the caddy brace arms 40 to move downwardly toward the top of the receptacle 12 and causing the caddy handle 38 to move upwardly. This movement is continued until the caddy brace arms 40 are positioned adjacent the upper rim 22 of the receptacle. The caddy brace arms 40 are then manually flexed outwardly away from each other to enable the brace arms 40 to pass over the opposite sides of the receptacle upper rim 20. This enables the caddy brace arms 40 to slide across the receptacle shoulder 18 as the brace arms are moved downwardly across the exterior surface of the shoulder. This downward movement of the brace arms 40 is continued until the post ledges 48 pass over the lower rim 24 of the receptacle shoulder 18. The resiliency of the brace arms 40 will then cause the post ledges 48 to snap back toward each other and engage against the underside of the receptacle lower rim 24. In this position of the caddy 14 relative to the receptacle 12, the caddy tray or body portion 30 is supported on the top of the receptacle handle 16 with the caddy clamp flange 64 extending below the receptacle handle 16. The caddy brace arms 40 extend across the opposite side surfaces of the receptacle shoulder 18 with the brace arm post ledges 48 engaging against the lower rim surface 24 of the receptacle shoulder. This securely and removably attaches to the caddy 14 to the receptacle 12 without the need for using separate fasteners. To remove the caddy 14 from the receptacle 12, it is only necessary to flex the brace arms 40 outwardly away from each other to disengage the post ledges 48 from the receptacle lower rim 24 and then pivot the caddy in the opposite direction about the receptacle handle 16.

In view of the foregoing, it will be seen that the several advantages of the invention are achieved and attained. The carts provided by the present invention are smaller in overall size then carts of equal capacity provided by previous approaches. As a result the manufacture of the caddies provided herein is more cost effective than manufacturing entire carts as with previous approaches. Additionally, the present invention allows access to the top of the receptacles, without hindrance, for removal or installation of receptacle liners. Also, the carts provided by the present invention possess superior tip-over resistance than previously available janitorial carts.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the exemplary embodiments, but should be defined in accordance with the claims and their equivalents.

What is claimed is:

1. A manually transportable trash receptacle caddy comprising:
   a tray-shaped body that is adapted to removably engage a handle of the receptacle for removably attaching the body to the receptacle, the body having an upper surface that projects outwardly from a side of the receptacle when the body is removably attached to the receptacle, whereby the upper surface is configured to support a variety of separate objects on the upper surface; and
   a brace projecting from the body and being shaped to engage a sidewall of the receptacle and to maintain the body in a substantially horizontal orientation when the receptacle is in an upright orientation and the body is removably attached to the receptacle;
   a receptacle including a handle and a sidewall;

the body engaging the handle of the receptacle;
the brace projecting from the body and engaging the sidewall of the receptacle thereby maintaining the body in a substantially horizontal orientation relative to the receptacle when the receptacle is in an upright orientation;
the brace having a pair of resilient arms that project outwardly from the body and engage around opposite sides of the receptacle sidewall; and,
a clamp flange projecting from the body and engaging the receptacle handle where the clamp flange and the pair of brace arms removably attach the caddy to the receptacle with the caddy body supported horizontally on the receptacle sidewall.

2. The caddy of claim 1, further comprising:
the body including at least one portion being adapted to store a janitorial device, the portion of the body including at least one of a pocket, a well, a partitioned area, a hook, and a hanger.

3. The caddy of claim 1, further comprising:
the brace having a ledge surface that is adapted to engage underneath a lower surface of a shoulder of the receptacle sidewall.

4. The caddy of claim 1, further comprising:
the body and the brace being a single, unitary piece.

5. The caddy of claim 1, further comprising:
the body being further adapted to engage the receptacle handle by being positioned on top of the handle.

6. The caddy of claim 1, further comprising:
the body being adapted to removably engage the handle and be connected to the handle without the use of separate fasteners.

7. The caddy of claim 1, further comprising:
each brace arm having a ledge surface that is positioned to engage beneath a portion of the receptacle sidewall in removably attaching the caddy on the receptacle.

8. The caddy of claim 1, further comprising:
a clamp base projecting from the body with the clamp flange being on the clamp base and the clamp base positioning the clamp flange beneath the body and in a position where the clamp flange engages beneath the receptacle handle when the body is positioned above the receptacle handle and the pair of brace arms are positioned around the receptacle sidewall in removably attaching the caddy on the receptacle.

9. The caddy of claim 8, further comprising:
the body having a front surface that extends across the body and across the pair of brace arms and the front surface is shaped to engage with the receptacle sidewall in removably attaching the caddy to the receptacle.

10. A manually transportable trash receptacle caddy comprising:
a tray-shaped body that is adapted to removably engage a handle of the receptacle for removably attaching the body to the receptacle, the body having an upper surface that projects outwardly from a side of the receptacle when the body is removably attached to the receptacle, whereby the upper surface is configured to support a variety of separate objects on the upper surface;
a brace projecting from the body and being shaped to engage a sidewall of the receptacle and to maintain the body in a substantially horizontal orientation when the receptacle is in an upright orientation and the body is removably attached to the receptacle; and,
the body being a first body of a pair of separate first and second bodies and the handle of the receptacle being a first handle of a pair of first and second handles on the receptacle, the caddy second body being adapted to removably engage the second handle of the receptacle.

11. The caddy of claim 10, further comprising:
the brace being a first brace on the first body, the caddy further comprising a second brace that projects from the second body, the first and second braces each being curved shaped to engage the sidewall of the receptacle and to maintain both the first body and the second body in a substantially horizontal orientation relative to the receptacle when the receptacle is in an upright orientation.

12. A caddy that is removably attachable to a manually transportable receptacle that has a sidewall surrounding an interior volume of the receptacle, a top opening to the interior volume of the receptacle, and at least one handle that projects outwardly from the receptacle sidewall, the caddy comprising:
a tray shaped body having a plurality of separate holders formed in the tray body for holding separate objects where the objects are readily accessible and removable from the holders of the tray body;
a pair of resilient arms that project outwardly from opposite sides of the tray body, the pair of arms being dimensioned to extend around opposite sides of the receptacle sidewall and engage with the opposite sides of the receptacle sidewall when removably attaching the caddy to the receptacle;
a clamp on the tray body, the clamp having a clamp base that projects downwardly from the tray body between the pair of resilient arms and the clamp having a clamp flange that projects from the clamp base away from the pair of resilient arms and at a spaced position underneath the tray body, the clamp base and the clamp flange being dimensioned to be inserted between the receptacle sidewall and the receptacle handle to position the clamp base between the receptacle sidewall and the receptacle handle and to position the clamp flange underneath the receptacle handle on an opposite side of the receptacle handle from the tray body when removably attaching the caddy to the receptacle.

* * * * *